(12) United States Patent
Wahl et al.

(10) Patent No.: US 8,713,688 B2
(45) Date of Patent: Apr. 29, 2014

(54) AUTOMATED SECURITY ANALYSIS FOR FEDERATED RELATIONSHIP

(75) Inventors: Mark Wahl, Austin, TX (US); Alex Weinert, Seattle, WA (US); Phil Stradling, Woodinville, WA (US); Matthew Penarczyk, Sammamish, WA (US); Craig Wittenberg, Mercer Island, WA (US); Dave Shute, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 12/731,133

(22) Filed: Mar. 24, 2010

(65) Prior Publication Data

US 2011/0239269 A1 Sep. 29, 2011

(51) Int. Cl.
G06F 21/20 (2006.01)

(52) U.S. Cl.
USPC .............................. 726/26; 713/152; 713/166

(58) Field of Classification Search
USPC .................. 726/1, 26; 713/152, 166
See application file for complete search history.

(56) References Cited

U.S. PATENT DOCUMENTS

| | | | |
|---|---|---|---|
| 7,487,539 B2 | 2/2009 | Ramachandran et al. | |
| 7,539,291 B2 * | 5/2009 | D'Angelo et al. | 379/88.17 |
| 7,555,464 B2 * | 6/2009 | Candelore | 705/59 |
| 7,562,382 B2 | 7/2009 | Hinton et al. | |
| 7,877,473 B2 * | 1/2011 | Tanaka | 709/224 |
| 2004/0128506 A1 | 7/2004 | Blakley et al. | |
| 2006/0129817 A1 * | 6/2006 | Borneman et al. | 713/170 |
| 2008/0010665 A1 | 1/2008 | Hinton et al. | |
| 2008/0168567 A1 * | 7/2008 | Hahn et al. | 726/28 |
| 2009/0089625 A1 | 4/2009 | Kannappan et al. | |

OTHER PUBLICATIONS

Baldwin, et al., On Identity Assurance in the Presence of Federated Identity Management Systems, Retrieved at <<http://www.hpl.hp.com/techreports/2007/HPL-2007-47R1.pdf>>, Proceedings of the 2007 ACM Workshop on Digital Identity Management, Nov. 2, 2007, pp. 11.

"Introduction to Oracle Identity Management", Retrieved at http://www.oracle.com/technology/products/id_mgmt/pdf/identity%20management%20white%20paper-v2.pdf>>, Sep. 2005, pp. 12.

Sim, Stuart, "Sun JavaTM System Identity Solution", Retrieved at http://www.terena.org/activities/tf-emc2/meetings/sep05/slides/stuartPresentation.pdf>>, Jan. 8, 2010, pp. 87.

* cited by examiner

Primary Examiner — Tae Kim
Assistant Examiner — Shu Chun Gao
(74) Attorney, Agent, or Firm — Ben Tabor; Kate Drakos; Micky Minhas (57) ABSTRACT

A secure collaboration mechanism between two organizations may be created based on a set of security system definitions provided by a receiving organization to a providing organization. The providing organization may create a shared portal that has a federated access between both organizations and has access and other security functions. The data collection process may be automated using digitally signed forms or other documents to analyze the security practices of the receiving organization and create a shared portal that has increased or decreased security provisions compared to the providing organization's standard procedures. The collaboration mechanism may be implemented in a bilateral arrangement, a hub and spoke arrangement, and a multilateral arrangement.

19 Claims, 4 Drawing Sheets

FIG. 4

AUTOMATED SECURITY ANALYSIS FOR FEDERATED RELATIONSHIP

BACKGROUND

There are many cases where two organizations may wish to collaborate with each other through their respective computer systems and networks. Because each organization may have different security systems and different implementations of security practices, there may be conflicts between the security demands of one organization and the security practices of the other.

SUMMARY

A secure collaboration mechanism between two organizations may be created based on a set of security system definitions provided by a receiving organization to a providing organization. The providing organization may create a shared portal that has a federated access between both organizations and has access and other security functions. The data collection process may be automated using digitally signed forms or other documents to analyze the security practices of the receiving organization and create a shared portal that has increased or decreased security provisions compared to the providing organization's standard procedures. The collaboration mechanism may be implemented in a bilateral arrangement, a hub and spoke arrangement, and a multilateral arrangement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A federated relationship may be created using an automated system to receive security data from a recipient organization, then create a shared repository that meets the security standards of a providing organization, the recipient organization, and the type or classification of data to be shared. The shared repository may implement a federation security policy and may incorporate various input and output filters to comply with the providing organization's and recipient organization's security policies as well as that of the shared data.

The system may create the federated relationship with very little human interaction. A person may cause the system to be launched and provide the recipient organization's security information, and the rest may be fully automated. In some cases, a human may approve the configuration of the shared repository, but after the configuration is determined automatically.

In some embodiments, a digital form may be filled out by a recipient organizations in a federated relationship, and the contents of the digital form may be used to create and configure the shared repository. The digital form may represent a schema of security configurations that may be provided by recipients in a federation arrangement.

The federated relationship may allow users to be authenticated by either participant organization in the relationship. For example, domain servers in either of the two participant's domains could authenticate users for access to a shared repository. Specifically, each domain server may authenticate users for their own organization, and that authentication may be recognized by the share repository. Such a relationship can be established when two organizations trust each other. Each organization may have different security architectures, different security mechanisms, and different security philosophies, and those differences may be represented by a federation security policy as well as various filters that may restrict data going into or out from the shared repository.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
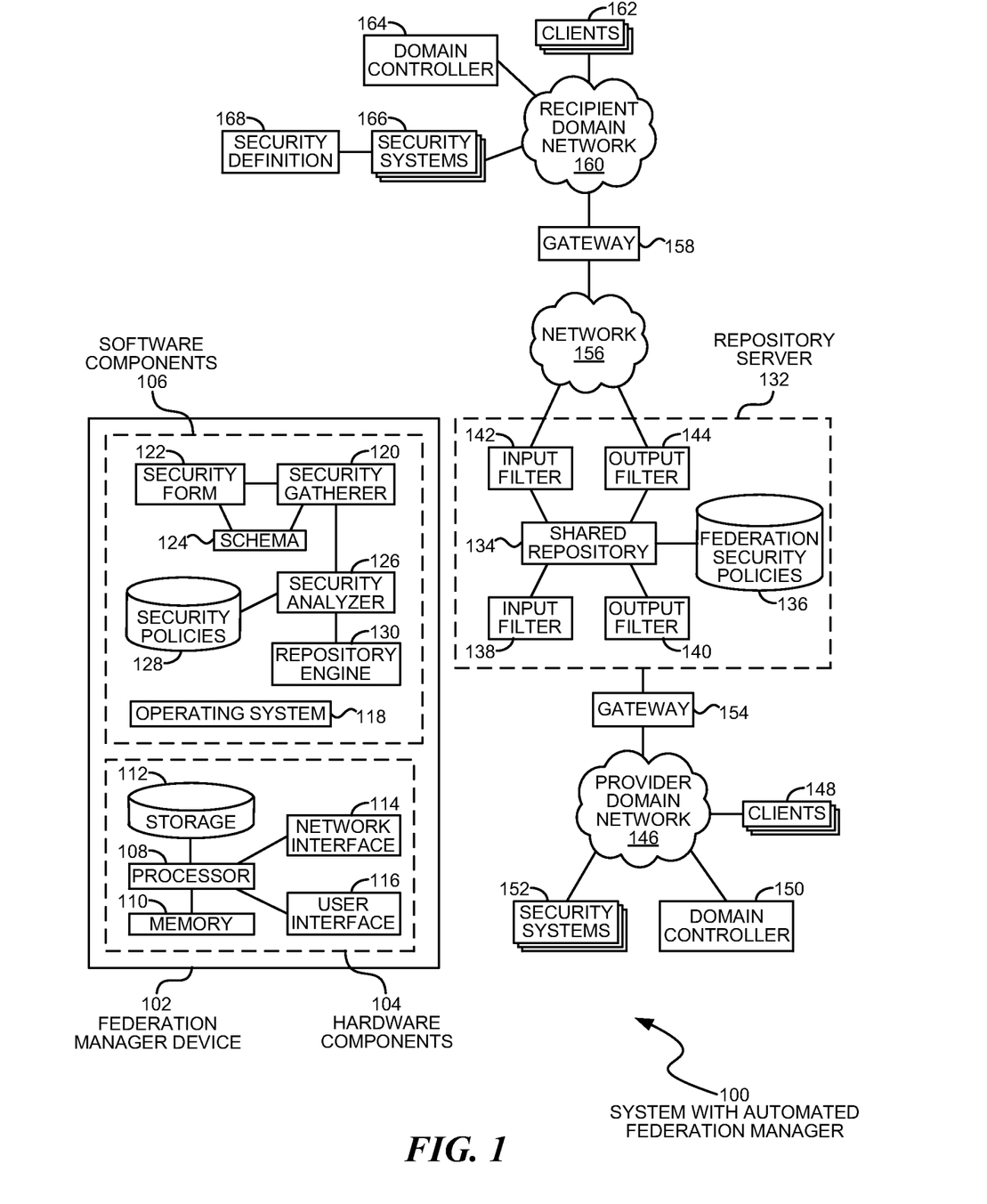
FIG. 1 is a diagram illustration of an embodiment showing an environment in which an automated federation manager may operate.

FIG. 1 is a diagram of an embodiment 100, showing a system for creating and managing a shared repository. Embodiment 100 is a simplified example of a network environment in which a shared repository may be created, as well as the components that may be used to prepare and use the repository.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a network environment in which a shared repository may be automatically deployed and configured. A shared repository may use federated authentication where the shared repository has been configured to trust two different domains or other authentication systems and each domain or other authentication system has been configured to authenticate its affiliated users to the level required for access to the shared repository.

A set of federation security policies may define various access and security parameters for the shared repository. The federation security policies may be derived from the differences and similarities between the two organizations that share the repository. In general, the shared repository may have all of the security attributes commonly shared between the organizations, and a set of filters may be used to further enforce restrictions due to any differences between the organizations. The filters may be configured to prevent certain information from being placed into or removed from the shared repository.

The shared repository may be automatically configured by comparing the provider organization's security policies and practices with the recipient organization's security policies and practices. The classification or nature of the shared information may also be considered in configuring the shared repository.

In order to automatically analyze security policies, a schema may define the information that may be analyzed. In a typical use scenario, a provider organization may transmit a digital form to a recipient organization, and the recipient organization may fill out and return the digital form. The digital form may include the security policies in the form of the schema so that the policies may be automatically analyzed. In another use scenario, various organizations may publish their security policies so that other organizations may consume the policies when establishing a federation agreement.

In many embodiments, the security policies may reference computer security standards and an organization's compliance with those standards. In some cases, a separate organization, recognized by both the provider organization and the recipient organization to be accredited for auditing to those computer security standards, may audit the organization and grant that organization certification for compliance to those standards.

In cases where one or more organizations are accredited certified to be in compliance to one or more security standards, the accreditation statement of certification may serve as a substitute for many of the items that may otherwise be included in a digital form or schema. For example, many security standards may include definitions of access control that may be granted to users. When an organization is not certified to any specific standard, the digital form may ask similar questions as an auditor may perform when certifying to one of the standards. When an organization has a certified compliance with a security standard, many of the data points gathered in the digital questionnaire may be skipped.

In this specification and claims, the two parties in a federation agreement are described as a "provider" and "recipient". In general, the "provider" may be the organization that is providing information through a shared repository to a "recipient" organization, although many embodiments may allow both organizations to provide and receive information through the shared repository. The "provider" organization may be the organization that provides the shared repository and performs the actions of gathering security policy information and creating and configuring a shared repository.

The terms "provider" and "recipient" are used in this specification and claims as merely identifiers for the parties to the federation agreement and are not meant to imply any particular function. In some embodiments, the "provider" organization may create and manage the shared repository but may receive a bulk of the information shared by the "recipient" organization, for example.

The security policies may define any aspect of computer security or 'cyber' security that could be implemented by an organization. Examples of security policy items may include high level organization-wide and organizational management security policies, risk assessment, asset management, human resources security, physical and environmental security, communications and operations management, access control, information systems acquisition, development, and maintenance, information security incident management, business continuity management, compliance, and other aspects. These various security policies may be defined in a digital form or questionnaire and used by a provider to configure a shared repository.

Each embodiment may have different manners for organizing the security policies and may have different levels of detail that may be suitable for their industry and the data used by those organizations. For example, organizations that routinely handle sensitive personal information, such as personal medical records, personal financial records, national security classified information, or other sensitive information may have very strict and complete security policies. Other organizations that handle less sensitive information may have less restrictive standards.

The federation security policies may be determined based on the type of information to be shared. For example, a shared repository that may be used to share sensitive national security classified information may have very stringent controls. The same organization may create a second shared repository with a landscaping vendor for managing the day to day landscaping maintenance of the organization's facilities, and the second shared repository may have much less restrictive security controls.

The security policies may include high level security policies that define priorities and goals for an organization. The high level security policies may segregate an enterprise into departments or other groups that have different security priorities. For example, a human resources department may have access to certain personnel files that have a higher level of security than a shipping and receiving department may have. The high level security policies may define minimum standards that all departments may meet in some cases.

The risk assessment portion of a security policy may define the potential value of a security breach with the cost of protecting against the breech. In an example above, the cost of a breach of national security sensitive information may include fines or even criminal prosecution, not to mention loss of a business contract. Such a cost may be very severe and therefore justifies a very high level of security. In the example of information used by a landscaping vendor for facilities maintenance, the cost of data loss may be a mere inconvenience or at most a defined sum of money. Such a potential loss may justify nominal security precautions, but not much more.

Asset management may be an aspect of security policies that deal with managing the hardware and software components within an organization. One example of how asset management relates to security policies may be that older assets, such as outdated hardware or software, may be entry points for computer attacks. Another example may be that assets removed from daily use may still contain sensitive information and an asset management plan may ensure that those assets are properly erased or destroyed so that sensitive information could not be gleaned from older assets.

A human resources security portion of a security policy may define how users are managed with respect to the computer systems. The policy may include background checks or other vetting performed prior to granting access, internal mechanisms used to transfer or change user access while the user is part of the organization, and processes used for removing that user from access when the user leaves the organization.

Physical and environmental security may relate to security policies by defining protection and monitoring of computer and communication facilities. The facilities may include datacenters and other facilities that may have restricted access, as well as general office areas, shipping and receiving areas, factory floor areas, and other facilities to which people may have access. In some deployments, certain areas within a facility may have different availability to certain types of data.

Communications and operations management may define those aspects of a security policy that relate to the technical security controls used within different communications mechanisms. The security controls may include encryption and access restrictions used in the various communications systems within an organization.

Access control may be the aspect of security policies that relate to the mechanisms used to restrict access to information and devices within an organization. As compared to physical security, access control may relate to granting or denying user access to devices, services, and information within a computer network. One aspect may be identification and authentication of a user. In some cases, different types of identification may be used, such as passwords, personal identification numbers, smart cards, security tokens, and the like. Other forms of identification may include finger print matching, voice recognition, retina matching, or other physiological metrics. Some access control systems may vary based on the physical location of a user. For example, the access control systems used for gaining access from outside an organization's premises may be much more stringent than for gaining access within a company facility.

Another aspect of access control may be restrictions placed on access to certain data. In large organizations, certain controlled data may be accessible to limited numbers of users. For example, human resources information may accessible to human resources professionals, but not to other users within an organization. In some cases, users may be given read only access while other users may be granted read and write access to certain data.

Audit trails and accountability may be implemented in some access control systems. An audit trail may identify which users accessed various data, services, devices, applications, or other monitored items within the computer network. The audit trail may be part of an overall accountability program that monitors how data, devices, and services are used within an organization.

Some security policies may include aspects of information systems acquisition, development, and maintenance. During the lifecycle of an application, especially custom designed applications for internal use, the security aspects of the application may be included throughout the design, testing, implementation, and archiving of the application.

Information security incident management systems may also be part of a security policy. The information security incident management system may identify security incidents and track their investigation, classification, resolution, and feedback to improve computer security.

Business continuity management may be included in an organization's security policies. Archiving, backup, recovery, and other aspects of business applications and business data may affect the overall security posture of an organization.

Some security policies may include compliance metrics and processes that may ensure that the security policies are being implemented. The compliance metrics may be regularly updated so that an organization's security professionals may monitor and track the security performance and implementation of the organization's security policies.

The security policy data that may be used to create and configure a shared repository may be different for various industries and embodiments. In embodiments where the organizations handle sensitive information and the shared data are sensitive, the security policy data may be very extensive. In contrast, when the organizations are not as sophisticated or when the potential exposures due to sharing the shared information does not pose a high risk are within the organization's risk appetite as acceptable risk, the security policy data may be comparatively minimal. In one embodiment where pharmaceutical companies may attempt to share patient sensitive information, a digital questionnaire may be thirty or more pages long. In contrast, a simple digital questionnaire for sharing relatively benign information may be a single page.

The device 102 may be a federation manager device that may process security policy information from a recipient organization, determine a federation security policy, and create and configure a shared repository. The device 102 is illustrated as a single device for the purposes of illustration. In other embodiments, the functions described for the device 102 may be performed by several different devices.

The device 102 may represent a conventional computer device having hardware components 104 and software components 106. In many embodiments, the device 102 may be a desktop computer, server computer, or other device.

The hardware components 104 may include a processor 108, random access memory 110, and nonvolatile storage 112. The hardware components 104 may also include a network interface 114 and a user interface 116.

The software components 106 may include an operating system 118 on which several databases and applications may operate.

A security gatherer 120 may collect security policy information from a recipient organization. In some embodiments, the security gatherer 120 may use a security form 122 that may be a digital questionnaire that may be filled out by a security professional from a recipient organization. The digital questionnaire may conform to a schema 124.

In some embodiments, a recipient organization may publish or supply security policy information in a format compatible with the schema 124. For example, a recipient organization may have already completed a questionnaire or performed some other process to create an XML document or other representation that defines the organization's security policy.

Some embodiments may have automated or semi-automated systems for analyzing a network of components to determine a security policy as implemented by an organization. In some cases, such a system may be a security audit system that may present a set of results that complies with the schema 124.

The security gatherer 120 may also gather security policy information for the provider organization. Such local security policy information may be manually or automatically generated.

A security analyzer 126 may analyze and compare the provider security policy 128, the recipient security policy, and the data to be shared to determine how a shared repository may be constructed and configured. The security analyzer 126 may identify common sets of security policies, as well as differences between the various organizations' security policies and the data to be shared.

A repository engine 130 may implement a federation security policy by creating a shared repository and performing various configuration functions.

The operations of the security gatherer 120, security analyzer 126, and repository engine 130 may be performed with very little, if any, human interaction in some cases. By automating many of the processes used to create a shared repository, the creation of a shared repository may be largely a business function rather than an information technology function. By using the automated system, business managers may be able to create shared repositories in response to business opportunities in a simple and efficient manner.

The process of collecting security policy information may be performed by an information technology professional or a computer security specialist. Once that information is collected, business professionals may then establish shared repositories in response to a business situation. For example, a pair of organizations may establish a shared repository to jointly prepare a proposal for a contract. When the security information is readily available, the business managers may configure a shared repository quickly and efficiently so that the business teams on both organizations can collaborate on a project.

The automated system may automate many of the complexities of creating a shared repository, establishing federated access control, while still protecting the information going into and out from the shared repository. Such a system may be very useful when handling sensitive or confidential information between two organizations with very rigid and secure policies, as the process of manually creating a shared repository in such a situation may be very complex and time consuming.

In some embodiments, a user interface may be used by a security gatherer 120 to receive the business objectives of the shared repository. The user interface may gather the type of information to be shared, which may include the classification level, access restrictions, or other parameters that may be used to generate any restrictions placed on a shared repository. Additionally, the business objectives may include the duration of the shared repository as well as archiving and disposal information for the shared repository during and after the life of the shared repository.

A repository server 132 may include a shared repository 134 that implements federation security policies 136. The federation security policies 136 may be defined by the security analyzer 126 and may define many different security aspects of the shared repository 134, including any of the aspects described above for security policies.

The repository server 132 may store various data about the shared repository 134, which may include the data used to create and set up the shared repositories. The data may include forms used to gather information used to create the shared repository 134, users permitted to access the shared repository 134, access logs, and usage archives for the shared repository 134. These administrative data may be accessed by administrators or information technology professionals to monitor and manage the shared repository 134.

The repository server 132 may have input and output filters that restrict information flow with respect to the shared repository 134. In the communication between the provider domain network 146 and the shared repository 134, an input filter 138 may restrict certain types of information from being placed in the shared repository, while and output filter 140 may restrict certain types of information that may be withdrawn from the shared repository 140. Similarly, input filter 142 and output filter 144 may restrict information exchanged with the shared repository 134 from the recipient domain network 160.

The various filters may be active or passive filters. An active filter may change or manipulate the information passing across the filter to desensitize or scrub the information. For example, a dataset may contain sensitive personal financial information, but a filter may be configured to restrict sensitive financial information. The filter may be configured to remove personally identifiable information from the financial information so that the information may be classified at a lower security level. In contrast, a passive filter may block the transmission of sensitive information, or may allow the transmission but write to an audit log and/or warn a security officer of such a transmission.

An input filter may restrict one of the participants from placing certain types of information into the shared repository. Such a filter may be useful when the participant's security policies are more restrictive than that of the shared repository, which may occur when the other participant's security policies are less restrictive or when the data to be shared have a less restrictive security policy.

An output filter may restrict one of the participants from copying or moving information from the shared repository into their own domain. Such a filter may be useful when the shared repository's security settings are more restrictive than that of the participant's security policy or when the data to be shared are at a higher classification than can be safely handled within the participant's domain.

The repository server 132 may facilitate digital rights management systems from within either the recipient domain network 160 or the provider domain network 146. In many cases, sensitive files may have a digital rights management (DRM) system enabled to prohibit or control access, copying, or other manipulation. Because of the federation relationship, a DRM-enabled document may receive authentication from the other partner in the federation relationship to allow access to the document by an authenticated user.

In some DRM systems, an author of a DRM-enabled document may provide a credential for opening or accessing the document. When the document is used within the same domain as the creator, the DRM system may authenticate against the local authentication mechanism. When the document is transmitted across the shared repository 134 to another domain, the repository server 132 may act as a conduit to pass the DRM related communications to the other domain for authentication.

The repository server 132 may allow users from a provider domain network 146 to access the repository server 132 as well as users from a recipient domain network 160. The repository server 132 is illustrated as being separated from the provider domain network 146 by a gateway 154. The repository server 132 is further illustrated as being connected to a network 156 that may be a wide area network such as the Internet. A gateway 158 may separate the network 156 from the recipient domain network 160.

In other embodiments, the repository server 132 may be located within the provider domain network 146.

The provider domain network 146 may include various clients 148, a domain controller 150, and various security systems 152. Similarly, the recipient domain network 160 may include various clients 162, a domain controller 164, and various security systems 166. The clients 148 or 162 may be devices that users may use to access the shared repository 134. In a typical computer environment, the clients 148 or 162 may be desktop computers, laptop computers, server computers, or other devices. In some cases, the clients 148 or 162 may include cellular telephones, game consoles, network appliances, or any other device connected to the respective network.

The domain controllers 150 and 164 may provide authentication for users within the respective network. The domain controllers 150 and 164 may provide federated authentication for users who attempt to connect to the repository server 132 directly. Those users with the proper credentials for the provider domain network 146 or 164 may be permitted access to the shared repository 134.

The various security systems 152 and 166 may be any type of service, device, function, configuration, or other item that may affect the security of a network. In some cases, the security systems 152 and 166 may include gateway devices, proxies, firewall devices, or other network security devices. The security systems 152 and 166 may include group policies or restrictions that define authentication procedures, password policies, or other items that may comply with various security policies.

The security systems 152 and 166 may be analyzed to determine the security policies of the respective networks. In many cases, the security gatherer 120 may automatically or semi-automatically scan the security systems 152 to determine a local security policy. In some cases, a scanning application may be supplied to the recipient domain network 160 to analyze the security systems 166 and provide a security definition 168.

The security definition 168 may comply with the schema 124 and may be consumed by the security analyzer 126. In some cases, the security definition 168 may be created by filling out a digital questionnaire or form.

Figure 2:
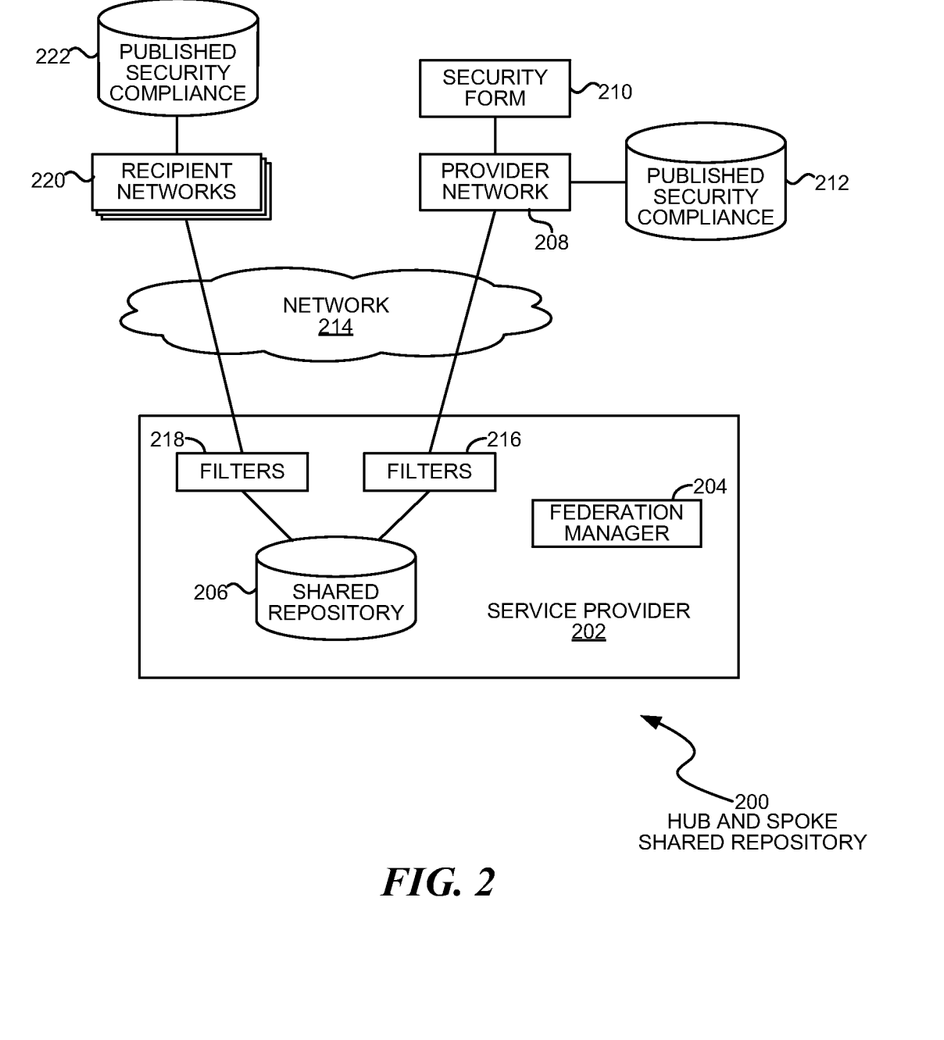
FIG. 2 is a diagram illustration of an embodiment showing a federation system in a hub and spoke configuration.

FIG. 2 is a diagram of an embodiment 200, showing a system for creating and managing a shared repository in a hub and spoke configuration. Embodiment 200 is a simplified example of a network environment in which a shared repository may be created with multiple recipient networks.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 is an example of a shared repository system that may be provided by a service provider 202, as well as a hub and spoke type of arrangement between a single provider network 208 and multiple recipient networks 220.

The service provider 202 may be a remotely hosted or cloud service that a third party may host for various parties that may wish to share or collaborate with each other. Such services may be delivered on a hardware platform in a datacenter, for example. As such, a provider network 208 may contact the service provider 202 with a set of security descriptors for a shared repository 206. The service provider 202 may have a federation manager 204 that may receive the various security policies from the provider network 208 and recipient networks 220 and create the shared repository 206 along with various filters 216 and 218.

The service provider 202 may be accessed from all participants through a network 214, which may be the Internet. The service provider 202 may physically reside in a datacenter and may be known as a cloud service.

In some embodiments, the provider network 208 may supply a security form 210 that the federation manager 204 may transmit to the recipient networks 220. The recipient networks 220 may return the form with unpublished or published security compliance 222 information. The security form 210 may be the mechanism by which information may be passed between the various parties to cause the federation manager 204 to create and configure the shared repository 206.

The federation manager 204 may include functions of a security gatherer, a security analyzer, and a repository engine, which may correspond with the security gatherer 120, security analyzer 126, and repository engine 130 as described in embodiment 100.

The arrangement of the various networks in embodiment 200 illustrate a hub and spoke arrangement, where the provider network 208 may act as a hub, and the various recipient networks 220 may act as the spokes. In such an arrangement, the provider network 208 may enter into a sharing arrangement with each of the recipient networks 220 individually or collectively.

Figure 3:
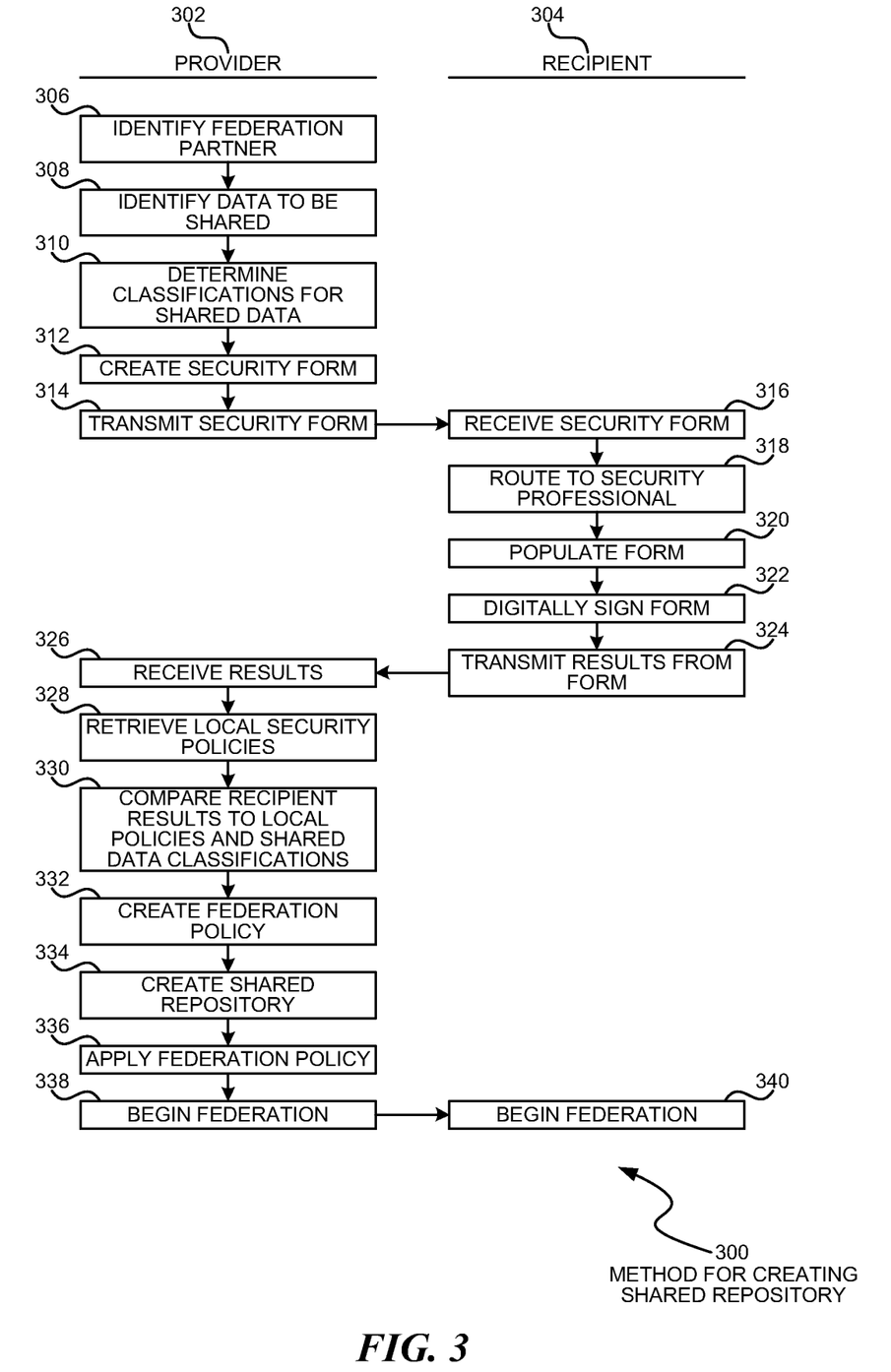
FIG. 3 is a timeline illustration of an embodiment showing a method for creating a shared repository.

FIG. 3 is a timeline illustration of an embodiment 300 showing a method for gathering security information and creating a shared repository. Embodiment 300 is a simplified illustration of the operations and communications between a provider 302 and a recipient 304. The operations of the provider 302 are illustrated on the left hand side, while the operations of the recipient 304 are illustrated on the right hand side of the figure.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate the processes and interaction that may occur between a provider organization and a recipient organization to determine how a shared repository may be configured and to deploy the shared repository.

A provider 302 may identify a federation partner in block 306 and identify data to be shared in block 308. Classifications for the shared data may be determined in block 310.

In blocks 302 through 310, a business manager may define the business reason for a federation arrangement and define some general parameters for the shared repository. The shared data and classification of the shared data may drive several of the decisions that may be made when configuring a shared repository. Highly sensitive shared data may invoke strict security precautions so that the sensitive nature of the data may be preserved, for example.

A security form may be created in block 312 and transmitted to the recipient 304 in block 314. The security form may have two components. One component may be a business component where a business manager on the recipient 304 network may verify the business reason for the shared repository. The second component may be a security component that may be filled out by a security professional.

The security form may be received by the recipient 304 in block 316. The portion of the security form relating to network security may be routed to the security professional in block 318, who may populate the form in block 320 and digitally sign the form in block 322.

The digital signature of block 322 may be used by the provider 302 as a measure of authenticity of the information. Because the information provided by the recipient 304 may be used to create a shared repository and potentially transmit sensitive information, the digital signature from the recipient 304 may be a link in the chain of authentication for such a relationship.

The recipient 304 may transmit the results of the questionnaire or form in block 324. In some cases, the form and the results may be transmitted, while in other cases only the results may be transmitted.

The results may be received in block 326 by the provider 302. The provider 302 may gather local security policies in block 328 and compare the results with the local policies and the shared data classifications in block 330. From the comparison of block 330, a federation policy may be created in block 332.

Figure 4:
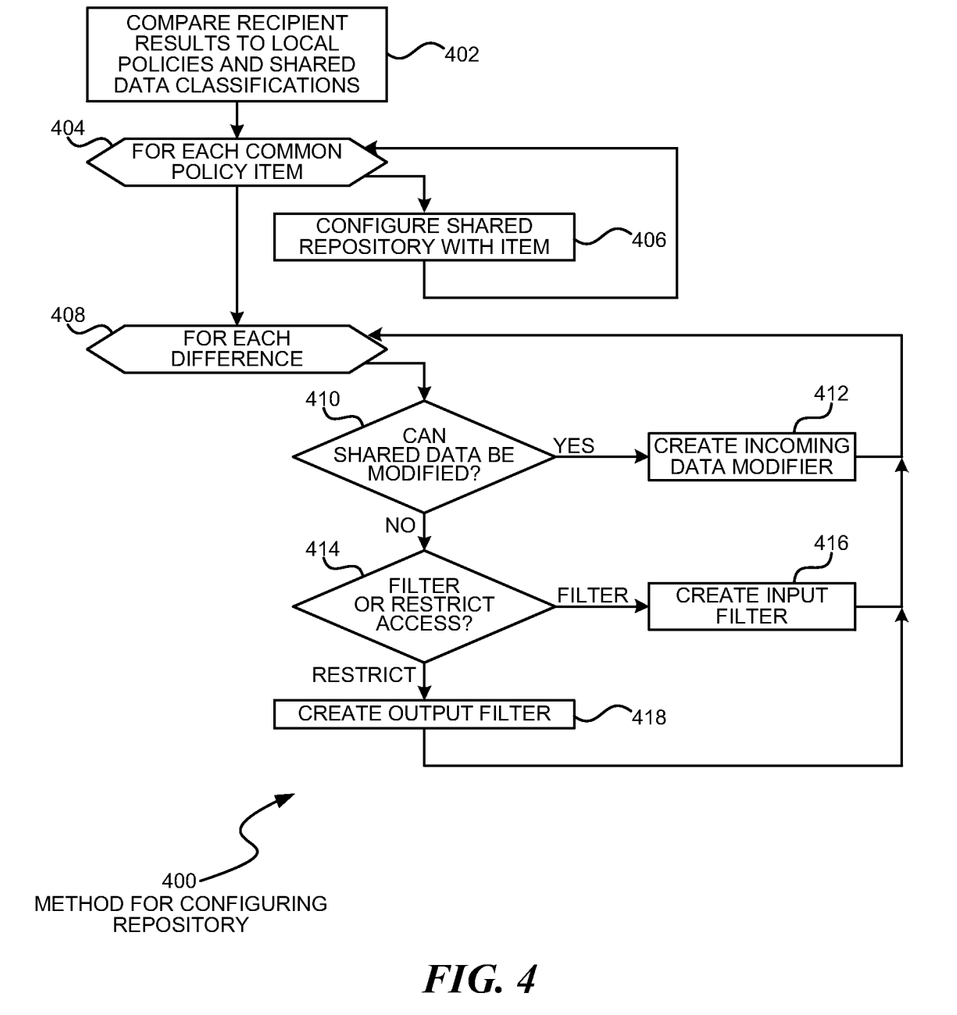
FIG. 4 is a flowchart illustration of an embodiment showing a method for configuring a repository.

A more detailed example of the processes of blocks 330 and 332 may be illustrated in embodiment 400 presented later in this specification.

A shared repository may be created in block 334 and the federation policy may be applied in block 336. The federation policy may include configuring the shared repository as well as any input or output filters.

Once the shared repository is created and the federation policy applied, the provider 302 and recipient 304 may begin federation and sharing in blocks 338 and 340.

FIG. 4 is a timeline illustration of an embodiment 400 showing a method for configuring a shared repository. Embodiment 400 may represent the operations that may be performed by a security analyzer, such as the security analyzer 126 of embodiment 100 as well as the functions of blocks 330 and 332 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may represent an example of the processes that may be performed to configure a shared repository.

In block 402, recipient security descriptors may be compared to local security policies and shared data classifications. From the comparison in block 402, common policy items may be identified as well as differences.

For each common policy item in block 404, the shared repository may be configured with the item in block 406. For example, the shared repository may be configured with encrypted communications when both the provider and recipient use that same encryption scheme as a default configuration with in their networks.

Each difference between the policies and shared data classification may be analyzed in block 408.

If the difference can be handled by modifying data that is placed into the shared repository in block 410, an incoming data modifier may be created in block 412. For example, one of the parties may have data designated for sharing that contain personally identifiable information. When the other party does not have security systems in place for the personally identifiable information, an incoming data modifier may be created to remove the personally identifiable information from any information placed into the shared repository.

If the shared data cannot be modified in block 410, an option in block 414 may either filter incoming data or restrict access to the data. When the filter is used in block 414, an input filter may be created in block 416 that may restrict the classified data from being placed into the repository.

In some situations, restricting the classified or sensitive information from being placed into the shared repository may unduly restrict the business goals of the shared repository. In such a case, an output filter may be created in block 418. An output filter may restrict a user from copying or moving the restricted data out of the shared repository and into an insecure network.

Once all of the differences are processed into either input or output filters in blocks 408 through 418, the shared repository may be configured and ready to use.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system including a processor, the computer system connection to a Wide Area Network (WAN) along with a first organization and a second organization, the first organization including a first gateway that separates a domain network for the first organization from the Wide Area Network (WAN), the second organization including a second gateway that separates a domain network for the second organization from the Wide Area Network (WAN), a method for configuring data sharing between the first organization and the second organization to perform a collaborative function, the method comprising:

comparing a first access policy organization for the first organization to a second access policy for the second organization;

determining the first access policy and the second access policy have one or more common security access definitions;

determining the first access policy and the second access policy have one or more differing security access definitions, at least one differing security access definition indicating a more restrictive data access policy for the first organization relative to the second organization, at least one other differing security access definition indicating a different more restrictive data access policy for the second organization relative to the first organization;

creating a federation data access policy, the federation data access policy representing the one or more common security access definitions;

the processor creating a separate shared repository on the Wide Area Network (WAN) for sharing data related to the collaborative function between the first organization and the second organization, the shared repository created to conform to the federation access policy;

the processor configuring the shared repository to:

take in data related to the collaborative function from the second organization for sharing with the first organization in accordance with the federation data access policy; and         take in data related to the collaborative function from the first organization for sharing with the second organization in accordance with federation data access policy;

the processor configuring an input filter between the first organization and the shared repository to limit what data related to the collaborative function can be sent from the first organization into the shared repository, the input filter compensating for the more restrictive data access policy for the first organization;

the processor configuring a second input filter between the second organization and the shared repository, the second input filter configured to limit what data related to the collaborative function can be sent from the second organization into the shared repository by removing at least one item from the data from the second organization so as to modify the data from the second organization to conform to the second access policy, the second input filter compensating for the different more restrictive data access policy for the second organization; and     the processor permitting users from both the first organization and the second organization to access data related to the collaborative function from the shared repository.

2. The method of claim 1 further comprising:
the processor configuring an output filter between the first organization and the shared repository to limit what data related to the collaborative function can be sent from the shared repository to the first organization, the output filter compensating for at least one of the one or more differing security access definitions.

3. The method of claim 1, further comprising:
configuring an output filter between the second organization and the shared repository to limit what data related to the collaborative function can be sent from the shared repository to the second organization, the output filter compensating for at least another of the one or more differing security access definitions.

4. The method of claim 3, the output filter:
allowing a user from the second organization to view a portion of data from the first organization; and
preventing the user from the second organization from copying the portion of data through the second gateway into the network domain for the second organization.

5. The method of claim 1 further comprising:
receiving a request from the first organization for a first portion of data created in the second organization the first portion of data having a digital rights management mechanism;
transmitting the portion of data into the network domain for the first organization;
receiving a digital rights management request for the first portion of data from the network domain for the first organization;
transmitting the digital rights management request to the network domain for the second organization;
receiving a digital rights management response from the network domain for the second organization; and
transmitting the digital rights management response to the network domain for the first organization.

6. A system for configuring data sharing between a provider domain and a recipient domain to perform collaborative function, the system comprising:
a processor;
system memory;
a network connection to a first domain, the first domain having a provider gateway between the first domain and Wide Area Network (WAN);
a network connection to a second domain, the second domain having a recipient gateway between the second domain and the Wide Area Network (WAN);
a security gathering mechanism that receives security descriptors from the recipient domain and from the provider domain;
a security analyzer that:
    analyzes the security descriptors from the recipient domain and from the provider domain to:
        determine that the security descriptors from the first domain and the security descriptors from the second domain have one or more common security descriptors; and
        determine that the security descriptors from the first domain and the security descriptors from the second domain have one or more differing security descriptors, at least one different security descriptor indicating a more restrictive data access policy for the first domain relative to the second domain, at least one other differing security access definition indicating a different more restrictive data access policy for the second domain relative to the first domain; and creates a federation data access policy, the federation data access policy representing the one or more common security descriptors; and a repository engine that:
  creates a separate shared repository on the Wide Area Network (WAN) for sharing data related to the collaborative function between the first domain and the second domain, the shared repository being:
    accessible from the first domain and from the second domain, configures the shared repository to take in data related to the collaborative function from the provider domain for sharing with the recipient domain in accordance with federation data access policy;
    configures an input filter between the provider organization first domain and the shared repository to limit what data related to the collaborative function can be sent from the first organization into the shared repository, the input filter compensating for the more restrictive data access policy for the first domain;
    configures a second input filter between the second organization and the shared repository, the second input filter configured to limit what data related to the collaborative function can be sent from the second organization into the shared repository by removing at least one item from the data from the second organization so as to modify the data from the second organization to conform to the second access policy, the second input filter compensating for the different more restrictive data access policy for the second organization; and
  permits users from both the first domain and the second domain to access data related to the collaborative function from the shared repository.

7. The system of claim 6, the security gathering mechanism receiving a digitally signed document comprising the security descriptors from the second domain.

8. The system of claim 7, the digitally signed document being generated from a digital form transmitted from the first domain to the second domain.

9. The system of claim 6, the security gathering mechanism receiving a digitally signed document comprising the security descriptors from the first domain.

10. The system of claim 6, the repository engine further creating an output filter between the shared repository and the second domain, the output filter being configured to restrict what data related to the collaborative function can be sent from the shared repository to the second organization, the output filter compensating for at least one of the one more of differing security descriptors.

11. The system of claim 6, wherein the security descriptors indicate compliance with a predefined security standard.

12. The system of claim 6 further comprising:
a network connection to a third domain, the third domain having a gateway between the third domain and the Wide Area Network (WAN); and
the repository engine making the shared repository additionally accessible from the third domain in accordance with the federation data access policy so as to share at least a portion of data related to the collaborative function with users in the third domain.

13. A computer-program product for use at computer system, the computer system connection to a Wide Area Network (WAN) along with a first organization and a second organization, the first organization including a first gateway that separates a domain network for the first organization from the Wide Area Network (WAN), the second organization including a second gateway that separates a domain network for the second organization from the Wide Area Network (WAN), the computer program product for implementing a method for configuring data sharing between the first organization and the second organization to perform a collaborative function, the computer program product comprising one or more computer storage devices having stored thereon computer-executable instructions that, when executed by a processor, cause the computer system to perform the method, including the following:
  compare a first access policy organization for the first organization to a second access policy for the second organization;
  determine the first access policy and the second access policy have one or more common security access definitions;
  determine the first access policy and the second access policy have one or more differing security access definitions, at least one differing security access definition indicating a more restrictive data access policy for the first organization relative to the second organization, at least one other differing security access definition indicating a different more restrictive data access policy for the second organization relative to the first organization;
  create a federation data access policy, the federation data access policy representing the one or more common security access definitions;
  create a separate shared repository on the Wide Area Network (WAN) for sharing data related to the collaborative function between the first organization and the second organization, the shared repository created to conform to the federation access policy;
  configure the shared repository to:
    take in data related to the collaborative function from the second organization for sharing with the first organization in accordance with the federation data access policy; and
    take in data related to the collaborative function from the first organization for sharing with the second organization in accordance with federation data access policy;
  configure an input filter on the Wide Area Network (WAN) between the first organization and the shared repository to limit what data related to the collaborative function can be sent from the first organization into the shared repository, the input filter compensating for the more restrictive data access policy for the first organization;
  configure a second input filter on the Wide Area Network (WAN) between the second organization and the shared repository to limit what data related to the collaborative function can be sent from the second organization into the shared repository by removing at least one item from the data from the second organization so as to modify the data from the second organization to conform to the second access policy, the second input filter compensating for the different more restrictive data access policy for the second organization; and
  permit users from both the first organization and the second organization to access data related to the collaborative function from the shared repository.

14. The computer-program product of claim 13, further comprising computer-executable instructions that, when executed, cause the computer system to configure an output filter between the first organization and the shared repository to limit what data related to the collaborative function can be sent from the shared repository to the first organization, the output filter compensating for at least one of the one or more differing security access definitions.

15. The computer-program product of claim 13, further comprising computer-executable instructions that, when executed, cause the computer system to configure an output filter between the second organization and the shared repository to limit what data related to the collaborative function can be sent from the shared repository to the second organization, the output filter compensating for at least another of the one or more differing security access definitions.

16. The computer-program product of claim 13, wherein computer-executable instructions that, when executed, cause the computer system to configure an output filter comprise computer-executable instructions that, when executed, cause the computer system to configure an output filter to:
   allow a user from the second organization to view a portion of data from the first organization; and
   prevent the user from the second organization from copying the portion of data through the second gateway into the network domain for the second organization.

17. The computer-program product of claim 13, wherein computer-executable instructions that, when executed, cause the computer system to configure a second input filter comprise wherein computer-executable instructions that, when executed, cause the computer system to configure a second input filter to remove at least one item from the data.

18. The system of claim 6, wherein the repository engine configuring an output filter comprises the repository engine configuring an output filter to:
   allow a user from the second organization to view a portion of data from the first organization; and
   prevent the user from the second organization from copying the portion of data through the second gateway into the network domain for the second organization.

19. The system of claim 6, wherein the repository engine configuring a second input filter comprises the repository engine configuring the second input filter to remove at least one item from the data.

* * * * *